(12) United States Patent
Huang et al.

(10) Patent No.: US 11,777,698 B2
(45) Date of Patent: Oct. 3, 2023

(54) UPLINK DUPLEX CONFIGURATION FOR UPLINK SWITCH

(71) Applicant: QUALCOMM Incorporated, San Diego, CA (US)

(72) Inventors: Yi Huang, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/249,027

(22) Filed: Feb. 17, 2021

(65) Prior Publication Data

US 2021/0258132 A1 Aug. 19, 2021

Related U.S. Application Data

(60) Provisional application No. 62/978,639, filed on Feb. 19, 2020.

(51) Int. Cl.
| | | |
|---|---|---|
| *H04L 5/14* | (2006.01) | |
| *H04W 72/04* | (2023.01) | |
| *H04W 72/0453* | (2023.01) | |

(52) U.S. Cl.
CPC ............ *H04L 5/14* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2016/0143035 A1* | 5/2016 | Xue | ................... | H04W 72/048 370/329 |
| 2016/0164622 A1* | 6/2016 | Yi | ........................ | H04L 5/0055 370/280 |
| 2017/0207889 A1 | 7/2017 | Mizusawa | | |
| 2017/0302419 A1* | 10/2017 | Liu | ........................ | H04L 5/0078 |
| 2019/0045397 A1* | 2/2019 | Mueck | .................. | H04W 88/06 |
| 2019/0098607 A1 | 3/2019 | Zhang et al. | | |
| 2019/0132775 A1* | 5/2019 | Lu | ..................... | H04W 36/0085 |
| 2019/0158137 A1* | 5/2019 | Brunel | ................. | H04B 1/0064 |
| 2020/0029260 A1 | 1/2020 | Kadiri et al. | | |

FOREIGN PATENT DOCUMENTS

| | | |
|---|---|---|
| CN | 105553605 A | 5/2016 |
| EP | 2693799 A1 | 2/2014 |
| EP | 3253155 A1 | 12/2017 |
| WO | WO-2017173388 A1 | 10/2017 |

OTHER PUBLICATIONS

International Search Report and Written Opinion—PCT/US2021/070162—ISA/EPO—dated Jun. 9, 2021.

* cited by examiner

*Primary Examiner* — Saba Tsegaye

(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may transmit, to a base station (BS), a UE capability indicator of a capability of the UE. The BS may select an uplink switch mode. The UE may receive, from the BS, signaling identifying the uplink switch mode, of a plurality of uplink switch modes, for switching one or more transmit chains of the UE between a first uplink duplex configuration and a second uplink duplex configuration. The UE may switch at least one uplink duplex configuration of at least one transmit chain of the UE based at least in part on the uplink switch mode. Numerous other aspects are provided.

30 Claims, 5 Drawing Sheets

UPLINK DUPLEX CONFIGURATION FOR UPLINK SWITCH

CROSS-REFERENCE TO RELATED APPLICATION

This patent application claims priority to U.S. Provisional Patent Application No. 62/978,639, filed on Feb. 19, 2020, entitled "UPLINK DUPLEX CONFIGURATION FOR UPLINK SWITCH," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for uplink duplex configuration for uplink switch.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include transmitting, to a base station (BS), a UE capability indicator of a capability of the UE; receiving, from the BS, signaling identifying an uplink switch mode, of a plurality of uplink switch modes, for switching one or more transmit chains of the UE between a first uplink duplex configuration and a second uplink duplex configuration; and switching at least one uplink duplex configuration of at least one transmit chain of the UE based at least in part on the uplink switch mode.

In some aspects, a method of wireless communication, performed by a BS, may include receiving, from a UE, a UE capability indicator of a capability of the UE; selecting, based at least in part on the UE capability indicator, an uplink switch mode, of a plurality of uplink switch modes, for switching one or more transmit chains of the UE between a first uplink duplex configuration and a second uplink duplex configuration; and transmitting, to the UE, signaling identifying the uplink switch mode to enable the UE to switch at least one uplink duplex configuration of at least one transmit chain of the UE in accordance with the uplink switch mode.

In some aspects, a UE for wireless communication may include a memory and one or more processors operatively coupled to the memory. The memory and the one or more processors may be configured to transmit, to a BS, a UE capability indicator of a capability of the UE; receive, from the BS, signaling identifying an uplink switch mode, of a plurality of uplink switch modes, for switching one or more transmit chains of the UE between a first uplink duplex configuration and a second uplink duplex configuration; and switch at least one uplink duplex configuration of at least one transmit chain of the UE based at least in part on the uplink switch mode.

In some aspects, a BS for wireless communication may include a memory and one or more processors operatively coupled to the memory. The memory and the one or more processors may be configured to receive, from a UE, a UE capability indicator of a capability of the UE; select, based at least in part on the UE capability indicator, an uplink switch mode, of a plurality of uplink switch modes, for switching one or more transmit chains of the UE between a first uplink duplex configuration and a second uplink duplex configuration; and transmit, to the UE, signaling identifying the uplink switch mode to enable the UE to switch at least one uplink duplex configuration of at least one transmit chain of the UE in accordance with the uplink switch mode.

In some aspects, a non-transitory computer-readable medium may store one or more instructions for wireless communication. The one or more instructions, when executed by one or more processors of a UE, may cause the one or more processors to transmit, to a BS, a UE capability indicator of a capability of the UE; receive, from the BS, signaling identifying an uplink switch mode, of a plurality of uplink switch modes, for switching one or more transmit chains of the UE between a first uplink duplex configuration and a second uplink duplex configuration; and switch at least one uplink duplex configuration of at least one transmit chain of the UE based at least in part on the uplink switch mode.

In some aspects, a non-transitory computer-readable medium may store one or more instructions for wireless communication. The one or more instructions, when executed by one or more processors of a BS, may cause the one or more processors to receive, from a UE, a UE capability indicator of a capability of the UE; select, based at least in part on the UE capability indicator, an uplink switch mode, of a plurality of uplink switch modes, for switching one or more transmit chains of the UE between a first uplink duplex configuration and a second uplink duplex configuration; and transmit, to the UE, signaling identifying the uplink switch mode to enable the UE to switch at least one uplink duplex configuration of at least one transmit chain of the UE in accordance with the uplink switch mode.

In some aspects, an apparatus for wireless communication may include means for transmitting, to a BS, a capability indicator of a capability of the apparatus; means for receiving, from the B S, signaling identifying an uplink switch mode, of a plurality of uplink switch modes, for switching one or more transmit chains of the apparatus between a first uplink duplex configuration and a second uplink duplex configuration; and means for switching at least one uplink duplex configuration of at least one transmit chain of the apparatus based at least in part on the uplink switch mode.

In some aspects, an apparatus for wireless communication may include means for receiving, from a UE, a UE capability indicator of a capability of the UE; means for selecting, based at least in part on the UE capability indicator, an uplink switch mode, of a plurality of uplink switch modes, for switching one or more transmit chains of the UE between a first uplink duplex configuration and a second uplink duplex configuration; and means for transmitting, to the UE, signaling identifying the uplink switch mode to enable the UE to switch at least one uplink duplex configuration of at least one transmit chain of the UE in accordance with the uplink switch mode.

Aspects generally include a method, apparatus, system, computer program product, non-transitory computer-readable medium, user equipment, base station, wireless communication device, or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
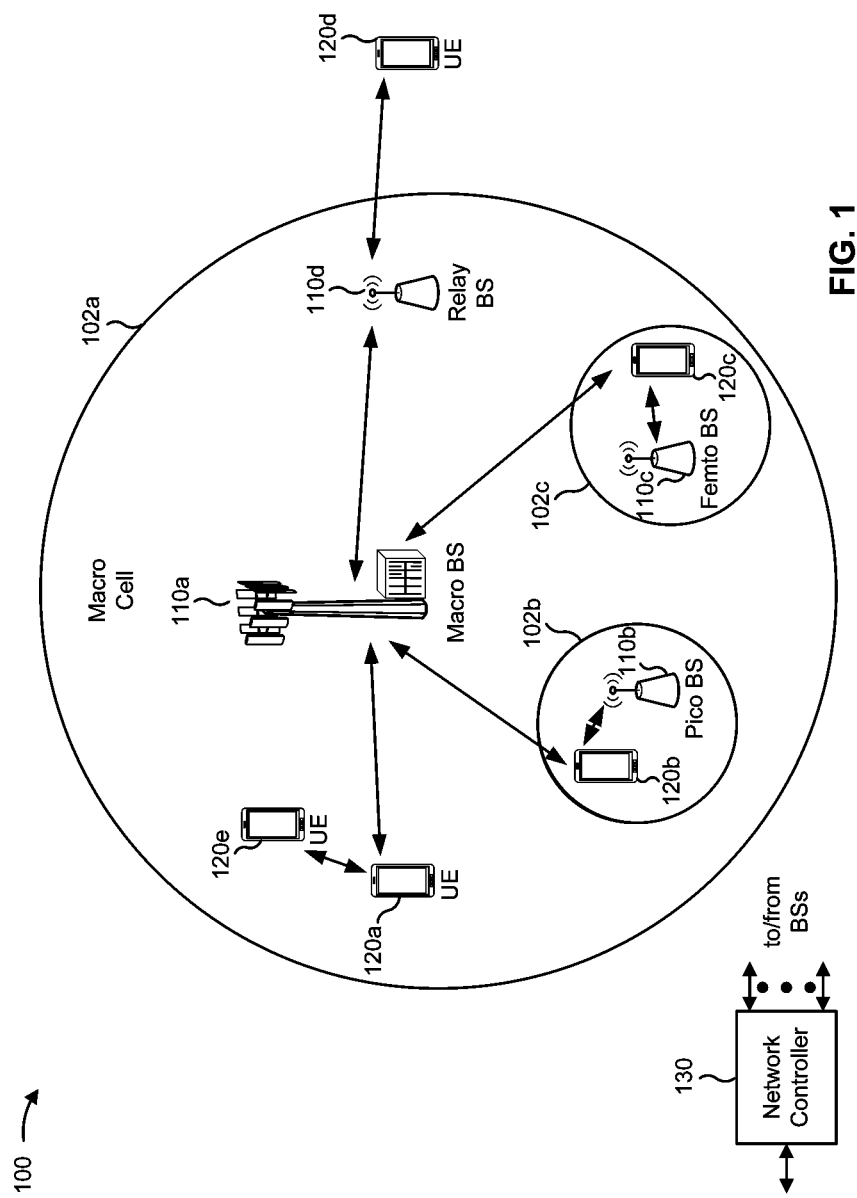
FIG. 1 is a block diagram conceptually illustrating an example of a wireless communication network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
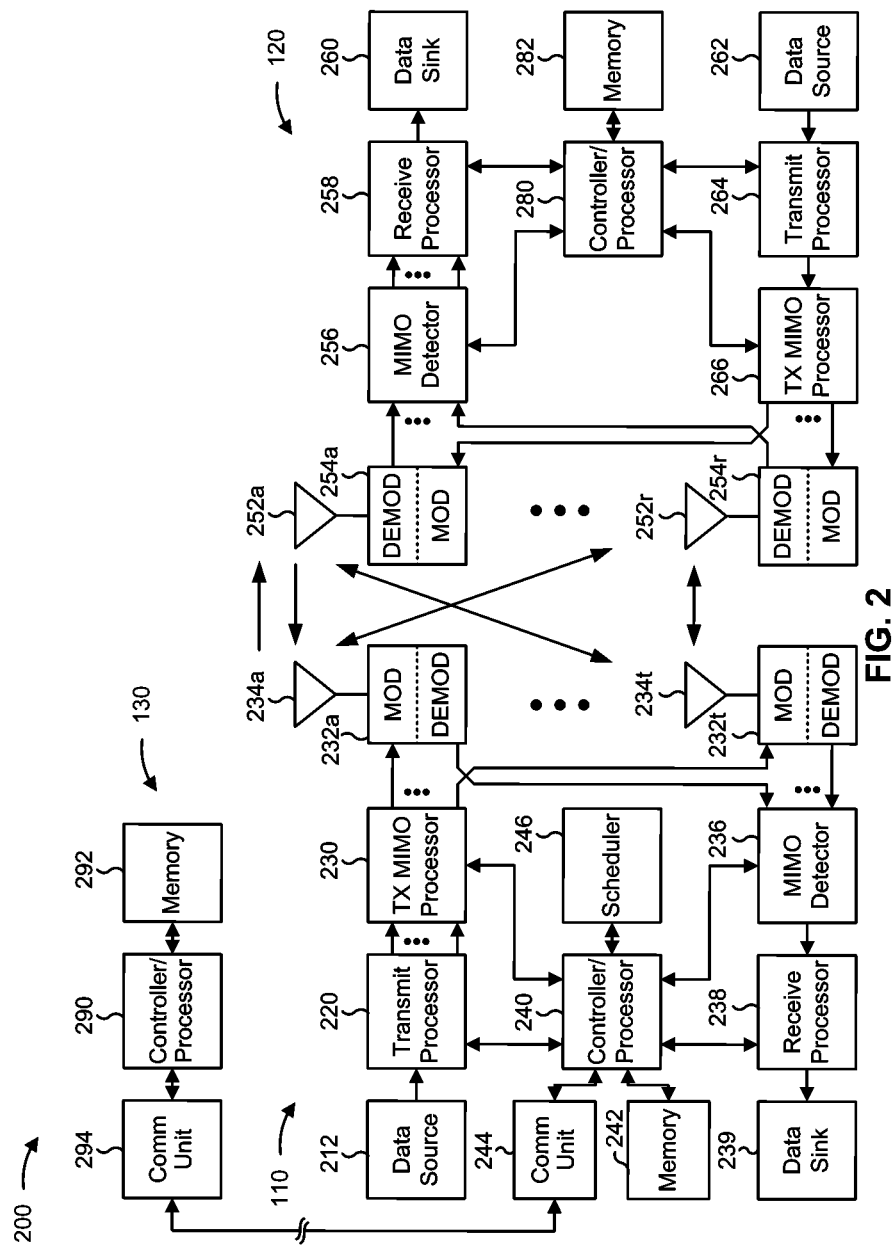
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports comprising RSRP, RSSI, RSRQ, or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, a modulator and a demodulator (e.g., MOD/DEMOD 254) of the UE 120 may be included in a modem of the UE 120. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292. In some aspects, a modulator and a demodulator (e.g., MOD/DEMOD 232) of the base station 110 may be included in a modem of the base station 110.

Controller/processor 240 of base station 110, controller/processor 280 of UE 120, and/or any other component(s) of FIG. 2 may perform one or more techniques associated with uplink duplex configuration for uplink switch, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. As such, memory 282 of the UE can comprise a non-transitory computer-readable medium storing one or more instructions for wireless communication, where the one or more instructions comprise one or more instructions that, when executed by one or more processors (e.g., processor 258 and/or controller/processor 280) of the UE 120, cause the one or more processors to perform the method described in greater detail with reference to FIGS. 3-5. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for transmitting (e.g., using transmit processor 264, TX MIMO processors 266, MOD 254, antenna 252, and/or the like), to a BS (e.g., BS 110), a UE capability indicator of a capability of UE 120, means for receiving (e.g., using antenna 252, DEMOD 254, MIMO detector 256, receive processor 258, and/or the like), from the BS, signaling identifying an uplink switch mode, of a plurality of uplink switch modes, for switching one or more transmit chains of UE 120 between a first uplink duplex configuration and a second uplink duplex configuration, means for switching (e.g., using transmit processor 264, TX MIMO processors 266, MOD 254, antenna 252, and/or the like) at least one uplink duplex configuration of at least one transmit chain of UE 120 based at least in part on the uplink switch mode, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving (e.g., using antenna 234, DEMOD 232, MIMO detector 236, receive processor 238, and/or the like), from a UE (e.g., UE 120), a UE capability indicator of a capability of the UE, means for selecting (e.g., using controller/processor 240), based at least in part on the UE capability indicator, an uplink switch mode, of a plurality of uplink switch modes, for switching one or more transmit chains of the UE between a first uplink duplex configuration and a second uplink duplex configuration, means for transmitting (e.g., using transmit processor 220, TX MIMO processor 230, MOD 232, antenna 234, and/or the like), to the UE, signaling identifying the uplink switch mode to enable the UE to switch at least one uplink duplex configuration of at least one transmit chain of the UE in accordance with the uplink switch mode, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Duplex communication may have multiple possible cases and options. For example, in a first case, a UE may transmit using a first transmit chain on a first carrier and may transmit using a second transmit chain on a second carrier. In a second case, the UE may transmit on the second carrier using both the first transmit chain and the second transmit chain. Each case may be associated with a plurality of options for mapping transmit chains to antenna ports. In a first option, an antenna port maps to the first carrier, but an antenna port is not mapped on the second carrier (e.g., as a result of time division duplexing (TDD) operation). In a second option, a first antenna port is optionally mapped on the first carrier and a second antenna port is optionally mapped on the second carrier.

A UE may switch from a first uplink duplex configuration to a second uplink duplex configuration. For example, the UE may switch from a first duplex configuration (the first case and the second option), in which the UE transmits on an uplink on a first carrier using a first transmit chain and transmits on an uplink on a second carrier using a second transmit chain, to a second duplex configuration (the second case in the first option or the second option), in which the UE transmits on an uplink on the second carrier using both the first transmit chain and the second transmit chain. In this case, the first carrier may be a frequency division duplexing (FDD) carrier and the second carrier may be a time division duplexing (TDD) carrier. As a result, the second transmit chain may switch from an FDD mode to a TDD mode when switching from the first case to the second case. When switching from a TDD mode to an FDD mode, or from an FDD mode to a TDD mode, a transmit frequency chain may need to be switched from TDD to FDD (or vice versa). A given transmit chain can include a baseband chain and a radio frequency chain. Switching a radio frequency chain from one mode to another is more challenging than switching a baseband chain from one mode to another. As such, as used herein, a "transmit chain" may refer to a radio frequency chain with a baseband chain or refer to a radio frequency chain without a baseband chain. Such a transmit chain can reside, for example, in MOD/DEMOD 254 of UE 120 in FIG. 2.

A UE may map uplink transmission ports and transmit chain states (e.g., which may correspond to case 1 and case 2, as described above). In a first option, as described above, for mapping, 0 antenna ports of the second carrier may be used in the first case. In a second option, as described above, for mapping, 1 antenna port of the second carrier may be used in the first case. In option 2, memory-based mapping may be performed in which the UE stores information identifying a current transmit chain state as either case 1 or case 2. In this case, when the UE is to perform a subsequent transmission, the UE may map transmit chains to the first case or the second case based at least in part on whether the current transmit chain state is already mapped to the first case or the second case. In contrast, memoryless-based mapping may be performed, in which the UE stores a fixed mapping such that when the UE is to perform a subsequent transmission, the UE may map transmit chains according to a fixed stored mapping. For example, the UE may always map a particular uplink duplex configuration to a particular case. Memory-based mapping may reduce a likelihood of switching uplink duplex configurations. Memoryless-based mapping may reduce a memory requirement of the UE by obviating a need to store a transmit chain state and may reduce a likelihood of state transition errors.

However, static selection of a single mapping type across all UEs in a network may result in mismatch between a UE capability and the mapping type. For example, when an uplink switch does not interrupt downlink transmission, use of memory-based mapping may result in unnecessary utilization of memory resources. Similarly, when an uplink switch does interrupt a downlink transmission, use of memoryless-based mapping may result in unnecessary interruptions to downlink transmission. Furthermore, not all UEs may have the same capability in terms of mapping type.

Some aspects described herein enable the UE to selectively use memory-based mapping or memoryless-based mapping. For example, the UE may provide a UE capability indicator to a BS. In this case, the BS may select or determine whether the UE is to use a memory-based mapping uplink switch mode or a memoryless-based mapping uplink switch mode. The BS may transmit signaling indicating which uplink switch mode is selected or determined for the UE and the UE may perform subsequent uplink duplex configuration switching in accordance with the selected or determined uplink switch mode. In some aspects, a mode of the UE may be fixed by a specification based at least in part on a factor, such as whether downlink transmission is impacted by an uplink switch (e.g., which may be based at least in part on an architecture of the UE). In some aspects, the UE may use the capability indicator signaling to enable the BS to dynamically determine the mode based at least in part on a factor. Moreover, some aspects described herein enable switching between cases or options. For example, a UE may switch between case 1, option 1 and case 2, option 2 or between case 1, option 2 and case 2, option 1. Other switches are possible.

Figure 3:
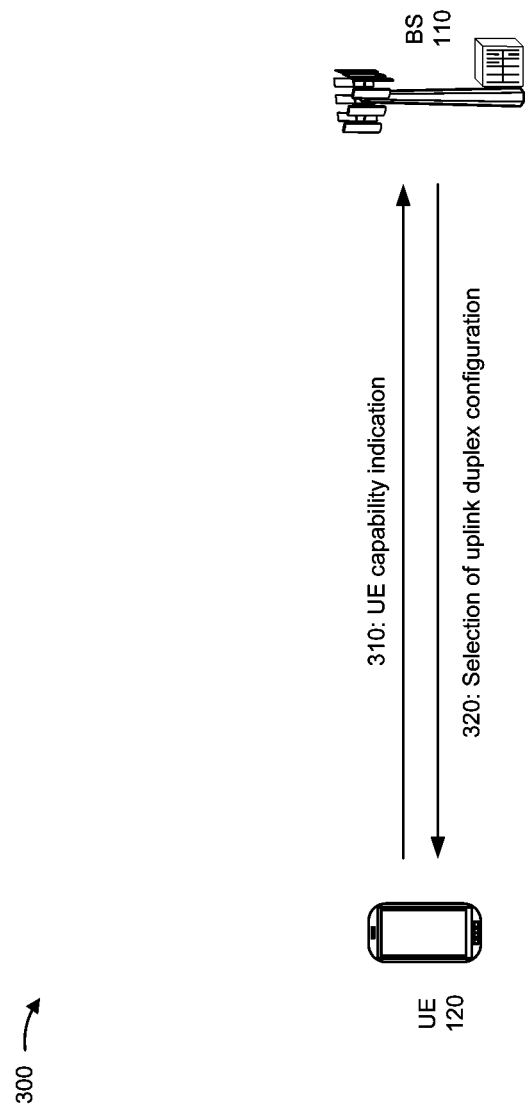
FIG. 3 is a diagram illustrating an example of uplink duplex configuration for uplink switch, in accordance with various aspects of the present disclosure.

FIG. 3 is a diagram illustrating an example 300 of uplink duplex configuration for uplink switch, in accordance with various aspects of the present disclosure. As shown in FIG. 3, example 300 includes a BS 110 and a UE 120.

As further shown in FIG. 3, and by reference number 310, UE 120 may transmit a UE capability indication. For example, UE 120 may transmit the UE capability indication to enable BS 110 to determine which of a plurality of uplink switch modes UE 120 is to use, such as a memory-based mapping uplink switch mode, a memoryless-based mapping uplink switch mode, and/or the like. Additionally, or alternatively, UE 120 may transmit the UE capability indication to enable BS 110 to determine which case or option to select for UE 120. In some aspects, the UE capability may be based at least in part on whether an uplink switch is to have an impact on a downlink transmission by UE 120 (e.g., which may be based at least in part on an architecture of UE 120). Additionally, or alternatively, the UE capability may be based at least in part on whether an uplink switch is allowed to interrupt a downlink transmission at UE 120 (e.g., which may be based at least in part on a UE use case, a UE traffic pattern, and/or the like). For example, when an uplink switch may interrupt a downlink transmission, BS 110 may determine to have UE 120 use the memory-based mapping uplink switch mode to reduce a likelihood of performing an uplink switch. Alternatively, when the uplink switch does not interrupt a downlink transmission, BS 110 may determine to have UE 120 use memoryless-based mapping to reduce a utilization of memory resources by UE 120.

Additionally, or alternatively, the UE capability may be based at least in part on which uplink switch modes UE 120 supports. For example, UE 120 may indicate that UE 120 supports memory-based mapping, memoryless-based mapping, both memory-based and memoryless-based mapping, another type of mapping, and/or the like. In some aspects, UE 120 may provide a UE capability indicator identifying UE 120, and BS 110 may determine one or more of the factors described above based at least in part on identifying UE 120 (e.g., as a particular type of UE 120, as being manufactured by a particular manufacturer, as using a particular type of software or hardware, and/or the like).

As further shown in FIG. 3, and by reference number 320, UE 120 may receive information identifying a selection or determination of which uplink duplex configuration to use. For example, UE 120 may receive information identifying a selection or determination of whether to use memory-based mapping or memoryless-based mapping. Additionally, or alternatively, UE 120 may receive information identifying a selection or determination of whether to use case 1 or case 2 or option 1 or option 2, among other examples of uplink duplex configurations. For example, BS 110 may transmit radio resource control (RRC) signaling to indicate that UE 120 is to use memory-based mapping, memoryless-based mapping, and/or the like. In this case, UE 120 may perform uplink duplex configuration switches in accordance with the selected and/or determined uplink switch mode.

As indicated above, FIG. 3 is provided as an example. Other examples may differ from what is described with respect to FIG. 3.

Figure 4:
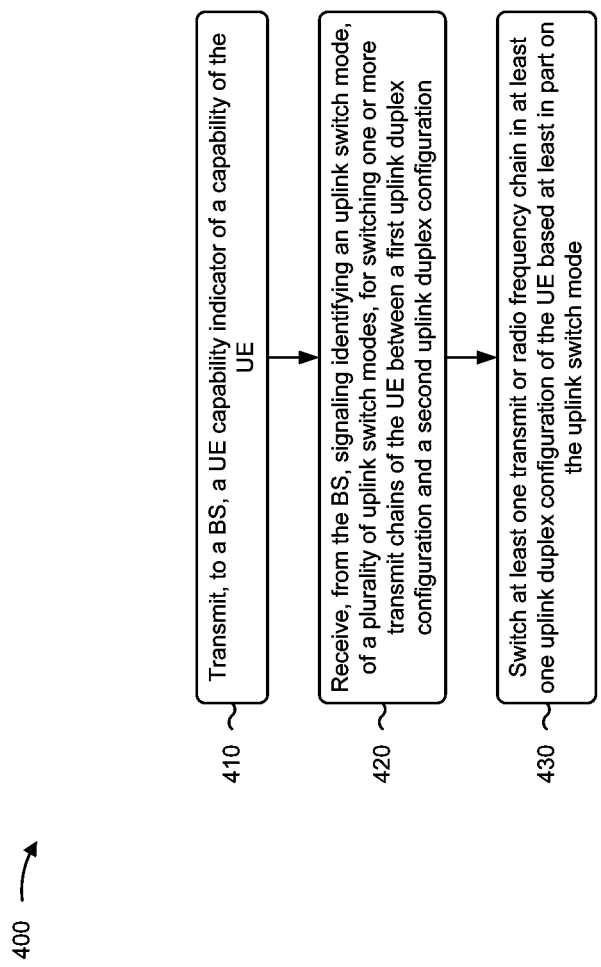
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 and/or the like) performs operations associated with uplink duplex configuration for uplink switch.

As shown in FIG. 4, in some aspects, process 400 may include transmitting, to a BS, a UE capability indicator of a capability of the UE (block 410). For example, the UE (e.g., using receive processor 258, transmit processor 264, controller/processor 280, memory 282, and/or the like) may transmit, to a B S, a UE capability indicator of a capability of the UE, as described above with reference to FIG. 3.

As further shown in FIG. 4, in some aspects, process 400 may include receiving, from the BS, signaling identifying an uplink switch mode, of a plurality of uplink switch modes, for switching one or more transmit chains of the UE between a first uplink duplex configuration and a second uplink duplex configuration (block 420). For example, the UE (e.g., using receive processor 258, transmit processor 264, controller/processor 280, memory 282, and/or the like) may receive, from the BS, signaling identifying an uplink switch mode, of a plurality of uplink switch modes, for switching one or more transmit chains of the UE between a first uplink duplex configuration and a second uplink duplex configuration, as described above with reference to FIG. 3.

As further shown in FIG. 4, in some aspects, process 400 may include switching at least one uplink duplex configuration of at least one transmit chain of the UE based at least in part on the uplink switch mode (block 430). For example, the UE (e.g., using receive processor 258, transmit processor 264, controller/processor 280, memory 282, and/or the like) may switch at least one uplink duplex configuration of at least one transmit chain of the UE based at least in part on the uplink switch mode, as described above with reference to FIG. 3.

Process 400 may include additional aspects, such as any single aspect or any combination of aspects described below and/or in connection with one or more other processes described elsewhere herein.

In a first aspect, the signaling is radio resource control signaling.

In a second aspect, alone or in combination with the first aspect, the capability of the UE is associated with whether an uplink switch affects downlink transmission at the UE.

In a third aspect, alone or in combination with one or more of the first and second aspects, the capability of the UE is associated with whether an uplink switch is permitted to interrupt downlink transmission at the UE.

In a fourth aspect, alone or in combination with one or more of the first through third aspects, the capability of the UE is associated with which of the plurality of uplink switch modes is supported by the UE.

In a fifth aspect, alone or in combination with one or more of the first through fourth aspects, the at least one uplink duplex configuration is associated with a utilization of one or more transmit chains on one or more carriers.

In a sixth aspect, alone or in combination with one or more of the first through fifth aspects, the at least one uplink duplex configuration is a mapping of uplink transmission ports to a transmit chain state.

In a seventh aspect, alone or in combination with one or more of the first through sixth aspects, the plurality of uplink switch modes includes a memory-based mapping mode and a memoryless-based mapping mode.

In an eight aspect, alone or in combination with one or more of the first through seventh aspects, the first uplink duplex configuration includes a first quantity of transmit chains mapped to a first quantity of carriers and the second uplink duplex configuration includes a second quantity of transmit chains mapped to a second quantity of carriers.

In a ninth aspect, alone or in combination with one or more of the first through eight aspects, the first uplink duplex configuration includes a first antenna port mapping configuration and the second uplink duplex configuration includes a second antenna port mapping configuration.

In a tenth aspect, alone or in combination with one or more of the first through ninth aspects, switching the at least one uplink duplex configuration includes switching from a first quantity of transmit chains mapped to a first quantity of carriers and a first antenna port mapping configuration, to a second quantity of transmit chains mapped to a second quantity of carriers and a second antenna port mapping configuration.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
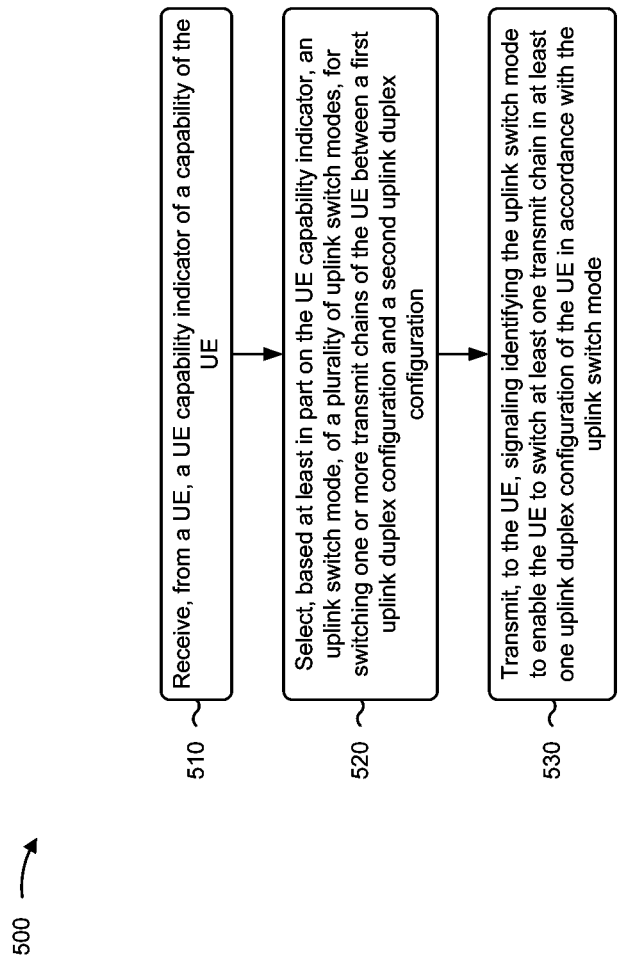
FIG. 5 is a diagram illustrating an example process performed, for example, by a base station, in accordance with various aspects of the present disclosure.

FIG. 5 is a diagram illustrating an example process 500 performed, for example, by a BS, in accordance with various aspects of the present disclosure. Example process 500 is an example where the BS (e.g., BS 110 and/or the like) performs operations associated with uplink duplex configuration for uplink switch.

As shown in FIG. 5, in some aspects, process 500 may include receiving, from a UE, a UE capability indicator of a capability of the UE (block 510). For example, the BS (e.g., using transmit processor 220, receive processor 238, controller/processor 240, memory 242, and/or the like) may receive, from a UE, a UE capability indicator of a capability of the UE, as described above with reference to FIG. 3.

As further shown in FIG. 5, in some aspects, process 500 may include selecting, based at least in part on the UE capability indicator, an uplink switch mode, of a plurality of uplink switch modes, for switching one or more transmit chains of the UE between a first uplink duplex configuration and a second uplink duplex configuration (block 520). For example, the BS (e.g., using transmit processor 220, receive processor 238, controller/processor 240, memory 242, and/or the like) may select, based at least in part on the UE capability indicator, an uplink switch mode, of a plurality of uplink switch modes, for switching one or more transmit chains of the UE between a first uplink duplex configuration and a second uplink duplex configuration, as described above with reference to FIG. 3.

As further shown in FIG. 5, in some aspects, process 500 may include transmitting, to the UE, signaling identifying the uplink switch mode to enable the UE to switch at least one uplink duplex configuration of at least one transmit chain of the UE in accordance with the uplink switch mode (block 530). For example, the BS (e.g., using transmit processor 220, receive processor 238, controller/processor 240, memory 242, and/or the like) may transmit, to the UE, signaling identifying the uplink switch mode to enable the UE to switch at least one uplink duplex configuration of at least one transmit chain of the UE in accordance with the uplink switch mode, as described above with reference to FIG. 3.

Process 500 may include additional aspects, such as any single aspect or any combination of aspects described below and/or in connection with one or more other processes described elsewhere herein.

In a first aspect, the signaling is radio resource control signaling.

In a second aspect, alone or in combination with the first aspect, the capability of the UE is associated with whether an uplink switch affects downlink transmission at the UE.

In a third aspect, alone or in combination with one or more of the first and second aspects, the capability of the UE is associated with whether an uplink switch is permitted to interrupt downlink transmission at the UE.

In a fourth aspect, alone or in combination with one or more of the first through third aspects, the capability of the UE is associated with which of the plurality of uplink switch modes is supported by the UE.

In a fifth aspect, alone or in combination with one or more of the first through fourth aspects, the at least one uplink duplex configuration is associated with a utilization of one or more transmit chains on one or more carriers.

In a sixth aspect, alone or in combination with one or more of the first through fifth aspects, the at least one uplink duplex configuration is a mapping of uplink transmission ports to a transmit chain state.

In a seventh aspect, alone or in combination with one or more of the first through sixth aspects, the plurality of uplink switch modes includes a memory-based mapping mode and a memoryless-based mapping mode.

In an eighth aspect, alone or in combination with one or more of the first through seventh aspects, the first uplink duplex configuration includes a first quantity of transmit chains mapped to a first quantity of carriers, and the second uplink duplex configuration includes a second quantity of transmit chains mapped to a second quantity of carriers.

In a ninth aspect, alone or in combination with one or more of the first through seventh aspects, the first uplink duplex configuration includes a first antenna port mapping configuration, and the second uplink duplex configuration includes a second antenna port mapping configuration.

In a tenth aspect, alone or in combination with one or more of the first through ninth aspects, the signaling identifies a switch of the at least one uplink duplex configuration from a first quantity of transmit chains mapped to a first quantity of carriers and a first antenna port mapping configuration, to a second quantity of transmit chains mapped to a second quantity of carriers and a second antenna port mapping configuration.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some aspects of the present disclosure:

Aspect 1: A method of wireless communication performed by a user equipment (UE), comprising: transmitting, to a base station (BS), a UE capability indicator of a capability of the UE; receiving, from the BS, signaling identifying an uplink switch mode, of a plurality of uplink switch modes, for switching one or more transmit chains of the UE between a first uplink duplex configuration and a second uplink duplex configuration; and switching at least one uplink duplex configuration of at least one transmit chain of the UE based at least in part on the uplink switch mode.

Aspect 2: The method of aspect 1, wherein the first uplink duplex configuration includes a first quantity of transmit chains mapped to a first quantity of carriers and the second uplink duplex configuration includes a second quantity of transmit chains mapped to a second quantity of carriers.

Aspect 3: The method of any of aspects 1 to 2, wherein the first uplink duplex configuration includes a first antenna port mapping configuration and the second uplink duplex configuration includes a second antenna port mapping configuration.

Aspect 4: The method of any of aspects 1 to 3, wherein switching the at least one uplink duplex configuration comprises: switching from a first quantity of transmit chains mapped to a first quantity of carriers and a first antenna port mapping configuration to a second quantity of transmit chains mapped to a second quantity of carriers and a second antenna port mapping configuration.

Aspect 5: The method of any of aspects 1 to 4, wherein the signaling is radio resource control signaling.

Aspect 6: The method of any of aspects 1 to 5, wherein the capability of the UE is associated with whether an uplink switch affects downlink transmission at the UE.

Aspect 7: The method of any of aspects 1 to 6, wherein the capability of the UE is associated with whether an uplink switch is permitted to interrupt downlink transmission at the UE.

Aspect 8: The method of any of aspects 1 to 7, wherein the capability of the UE is associated with which of the plurality of uplink switch modes is supported by the UE.

Aspect 9: The method of any of aspects 1 to 8, wherein the at least one uplink duplex configuration is associated with a utilization of one or more transmit chains on one or more carriers.

Aspect 10: The method of any of aspects 1 to 9, wherein the at least one uplink duplex configuration is a mapping of uplink transmission ports to a transmit chain state.

Aspect 11: The method of aspect 10, wherein the plurality of uplink switch modes includes a memory-based mapping mode and a memoryless-based mapping mode.

Aspect 12: A method of wireless communication performed by a base station (BS), comprising: receiving, from a user equipment (UE), a UE capability indicator of a capability of the UE; selecting, based at least in part on the UE capability indicator, an uplink switch mode, of a plurality of uplink switch modes, for switching one or more transmit chains of the UE between a first uplink duplex configuration and a second uplink duplex configuration; and transmitting, to the UE, signaling identifying the uplink switch mode to enable the UE to switch at least one uplink duplex configuration of at least one transmit chain of the UE in accordance with the uplink switch mode.

Aspect 13: The method of aspect 12, wherein the first uplink duplex configuration includes a first quantity of transmit chains mapped to a first quantity of carriers and the second uplink duplex configuration includes a second quantity of transmit chains mapped to a second quantity of carriers.

Aspect 14: The method of any of aspects 12 to 13, wherein the first uplink duplex configuration includes a first antenna port mapping configuration and the second uplink duplex configuration includes a second antenna port mapping configuration.

Aspect 15: The method of any of aspects 12 to 14, wherein the signaling identifies a switch of the at least one uplink duplex configuration from a first quantity of transmit chains mapped to a first quantity of carriers and a first antenna port mapping configuration to a second quantity of transmit chains mapped to a second quantity of carriers and a second antenna port mapping configuration.

Aspect 16: The method of any of aspects 12 to 15, wherein the signaling is radio resource control signaling.

Aspect 17: The method of any of aspects 12 to 16, wherein the capability of the UE is associated with whether an uplink switch affects downlink transmission at the UE.

Aspect 18: The method of any of aspects 12 to 17, wherein the capability of the UE is associated with whether an uplink switch is permitted to interrupt downlink transmission at the UE.

Aspect 19: The method of any of aspects 12 to 18, wherein the capability of the UE is associated with which of the plurality of uplink switch modes is supported by the UE.

Aspect 20: The method of any of aspects 12 to 19, wherein the at least one uplink duplex configuration is associated with a utilization of one or more transmit chains on one or more carriers.

Aspect 21: The method of any of aspects 12 to 20, wherein the at least one uplink duplex configuration is a mapping of uplink transmission ports to a transmit chain state.

Aspect 22: The method of aspect 21, wherein the plurality of uplink switch modes includes a memory-based mapping mode and a memoryless-based mapping mode.

Aspect 23: An apparatus for wireless communication at a device, comprising a processor; memory coupled with the processor; and instructions stored in the memory and executable by the processor to cause the apparatus to perform the method of one or more aspects of aspects 1-11.

Aspect 24: A device for wireless communication, comprising a memory and one or more processors coupled to the memory, the memory and the one or more processors configured to perform the method of one or more aspects of aspects 1-11.

Aspect 25: An apparatus for wireless communication, comprising at least one means for performing the method of one or more aspects of aspects 1-11.

Aspect 26: A non-transitory computer-readable medium storing code for wireless communication, the code comprising instructions executable by a processor to perform the method of one or more aspects of aspects 1-11.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-11.

Aspect 28: An apparatus for wireless communication at a device, comprising a processor; memory coupled with the processor; and instructions stored in the memory and executable by the processor to cause the apparatus to perform the method of one or more aspects of aspects 12-22.

Aspect 29: A device for wireless communication, comprising a memory and one or more processors coupled to the memory, the memory and the one or more processors configured to perform the method of one or more aspects of aspects 12-22.

Aspect 30: An apparatus for wireless communication, comprising at least one means for performing the method of one or more aspects of aspects 12-22.

Aspect 31: A non-transitory computer-readable medium storing code for wireless communication, the code comprising instructions executable by a processor to perform the method of one or more aspects of aspects 12-22.

Aspect 32: A non-transitory computer-readable medium storing a set of instructions for wireless communication, the set of instructions comprising one or more instructions that, when executed by one or more processors of a device, cause the device to perform the method of one or more aspects of aspects 12-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software.

"Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors coupled to the memory, the one or more processors configured to:
   transmit, to a network node, a UE capability indicator of a capability of the UE;
   receive, from the network node, signaling identifying an uplink switch mode, of a plurality of uplink switch modes, for switching one or more transmit chains of the UE between a first duplex configuration and a second duplex configuration,
   wherein the first duplex configuration is associated with the UE transmitting on a first uplink using a first carrier and a first transmit chain and transmitting on a second uplink using a second carrier and a second transmit chain, and
   wherein the second duplex configuration is associated with the UE transmitting on a third uplink using the second carrier and both the first transmit chain and the second transmit chain; and switch amongst the first duplex configuration and the second duplex configuration based at least in part on the uplink switch mode.

2. The UE of claim 1, wherein at least one of the first duplex configuration includes a first antenna port mapping configuration or the second duplex configuration includes a second antenna port mapping configuration.

3. The UE of claim 1, wherein the one or more processors, when switching amongst the first duplex configuration and the second duplex configuration, are configured to:

switch amongst the first transmit chain and the second transmit chain.

4. The UE of claim 1, wherein the signaling is radio resource control signaling.

5. The UE of claim 1, wherein the capability of the UE is associated with whether an uplink switch affects downlink transmission at the UE.

6. The UE of claim 1, wherein the capability of the UE is associated with whether an uplink switch is permitted to interrupt downlink transmission at the UE.

7. The UE of claim 1, wherein the capability of the UE is associated with which of the plurality of uplink switch modes is supported by the UE.

8. The UE of claim 1, wherein the first carrier is associated with a first antenna port and the second carrier is independent of any antenna port.

9. The UE of claim 1, wherein the plurality of uplink switch modes includes a memory-based mapping mode and a memoryless-based mapping mode, each associated with a mapping of at least one of the first transmit chain or the second transmit chain to a quantity of antenna ports.

10. The UE of claim 1, wherein the first carrier is associated with a first antenna port and the second carrier is associated with a second antenna port.

11. A network node for wireless communication, comprising:

a memory; and one or more processors coupled to the memory, the one or more processors configured to:

receive, from a user equipment (UE), a UE capability indicator of a capability of the UE;

select, based at least in part on the UE capability indicator, an uplink switch mode, of a plurality of uplink switch modes, for switching one or more transmit chains of the UE between a first duplex configuration and a second duplex configuration, wherein the first duplex configuration is associated with the UE transmitting on a first uplink using a first carrier and a first transmit chain and transmitting on a second uplink using a second carrier and a second transmit chain, and wherein the second duplex configuration is associated with the UE transmitting on a third uplink using the second carrier and both the first transmit chain and the second transmit chain; and transmit, to the UE, signaling identifying the uplink switch mode to enable the UE to switch amongst the first duplex configuration and the second duplex configuration.

12. The network node of claim 11, wherein at least one of the first duplex configuration includes a first antenna port mapping configuration or the second duplex configuration includes a second antenna port mapping configuration.

13. The network node of claim 11, wherein the signaling identifies a switch amongst the first transmit chain and the second transmit chain.

14. The network node of claim 11, wherein the signaling is radio resource control signaling.

15. The network node of claim 11, wherein the capability of the UE is associated with whether an uplink switch affects downlink transmission at the UE.

16. The network node of claim 11, wherein the capability of the UE is associated with whether an uplink switch is permitted to interrupt downlink transmission at the UE.

17. The network node of claim 11, wherein the capability of the UE is associated with which of the plurality of uplink switch modes is supported by the UE.

18. The network node of claim 11, wherein the first carrier is associated with a first antenna port and the second carrier is independent of any antenna port.

19. The network node of claim 18, wherein the plurality of uplink switch modes includes a memory-based mapping mode and a memoryless-based mapping mode, each associated with a mapping of at least one of the first transmit chain or the second transmit chain to a quantity of antenna ports.

20. The network node of claim 11, wherein the first carrier is associated with a first antenna port and the second carrier is associated with a second antenna port.

21. A method of wireless communication performed by a user equipment (UE), comprising:

transmitting, to a network node, a UE capability indicator of a capability of the UE;

receiving, from the network node, signaling identifying an uplink switch mode, of a plurality of uplink switch modes, for switching one or more transmit chains of the UE between a first duplex configuration and a second duplex configuration, wherein the first duplex configuration is associated with the UE transmitting on a first uplink using a first carrier and a first transmit chain and transmitting on a second uplink using a second carrier and a second transmit chain, and wherein the second duplex configuration is associated with the UE transmitting on a third uplink using the second carrier and both the first transmit chain and the second transmit chain; and switching amongst the first duplex configuration and the second duplex configuration based at least in part on the uplink switch mode.

22. The method of claim 21, wherein the first duplex configuration includes a first antenna port mapping configuration and the second duplex configuration includes a second antenna port mapping configuration.

23. The method of claim 21, wherein switching amongst the first duplex configuration and the second duplex configuration comprises:

switching amongst the first transmit chain and the second transmit chain.

24. The method of claim 21, wherein the first carrier is associated with a first antenna port and the second carrier is associated with a second antenna port.

25. The method of claim 21, wherein the first carrier is associated with a first antenna port and the second carrier is independent of any antenna port.

26. The method of claim 21, wherein the plurality of uplink switch modes includes a memory-based mapping mode and a memoryless-based mapping mode, each associated with a mapping of at least one of the first transmit chain or the second transmit chain to a quantity of antenna ports.

27. A method of wireless communication performed by a network node, comprising:

receiving, from a user equipment (UE), a UE capability indicator of a capability of the UE;

selecting, based at least in part on the UE capability indicator, an uplink switch mode, of a plurality of uplink switch modes, for switching one or more transmit chains of the UE between a first duplex configuration and a second duplex configuration, wherein the first duplex configuration is associated with the UE transmitting on a first uplink using a first carrier and a first transmit chain and transmitting on a second uplink using a second carrier and a second transmit chain, and wherein the second duplex configuration is associated with the UE transmitting on a third uplink using the second carrier and both the first transmit chain and the second transmit chain; and transmitting, to the UE, signaling identifying the uplink switch mode to enable the UE to switch amongst the first duplex configuration and the second duplex configuration.

28. The method of claim 27, wherein at least one of the first duplex configuration includes a first antenna port mapping configuration or the second duplex configuration includes a second antenna port mapping configuration.

29. The method of claim 27, wherein the signaling identifies a switch the first transmit chain the second transmit chain.

30. The method of claim 27, wherein the plurality of uplink switch modes includes a memory-based mapping mode and a memoryless-based mapping mode, each associated with a mapping of at least one of the first transmit chain or the second transmit chain to a quantity of antenna ports.

* * * * *